(No Model.)  
G. T. WARWICK.  
VELOCIPEDE.
No. 434,615. Patented Aug. 19, 1890.
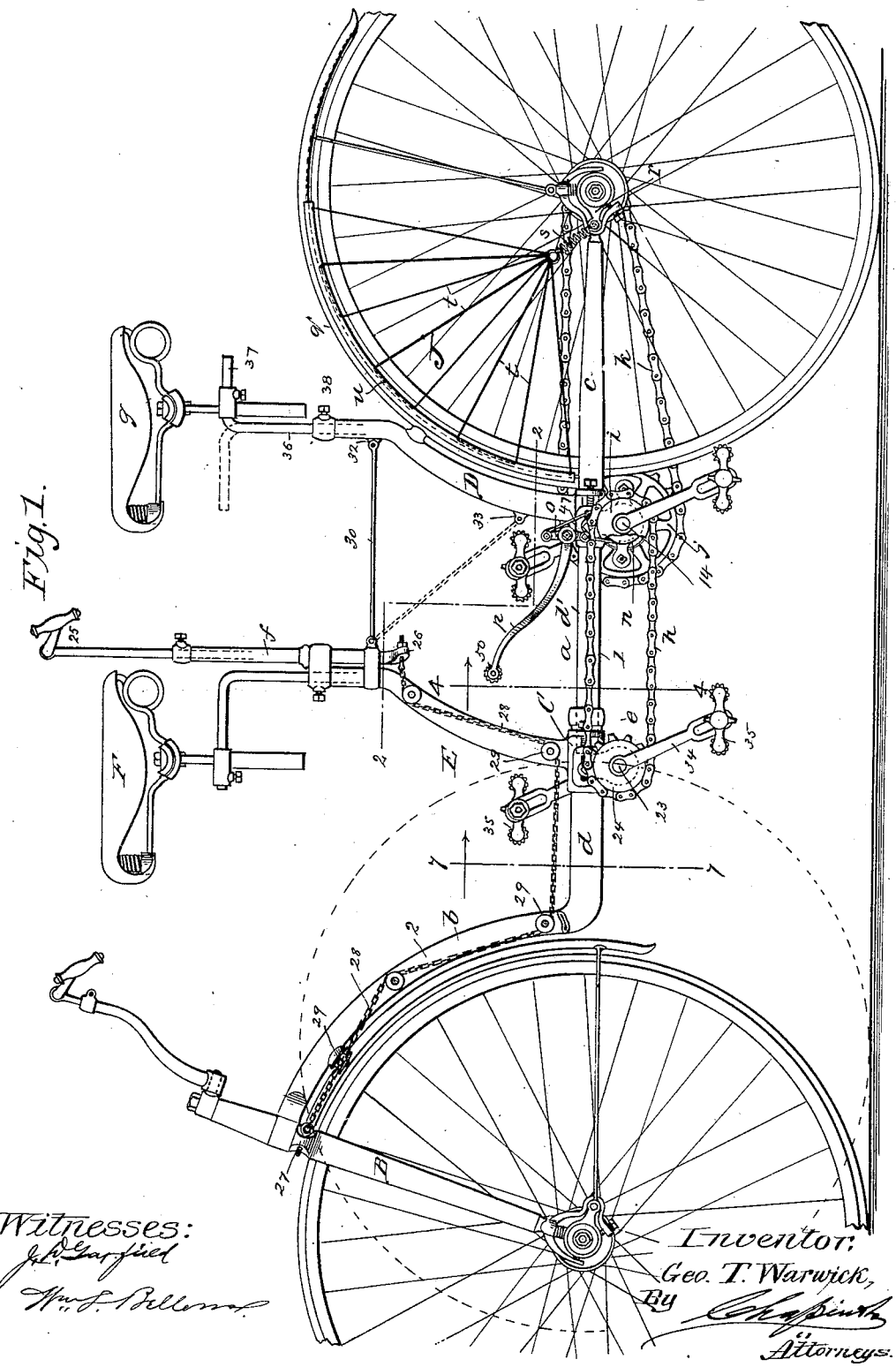

(No Model.) 5 Sheets—Sheet 2.
G. T. WARWICK.
VELOCIPEDE.
No. 434,615. Patented Aug. 19, 1890.
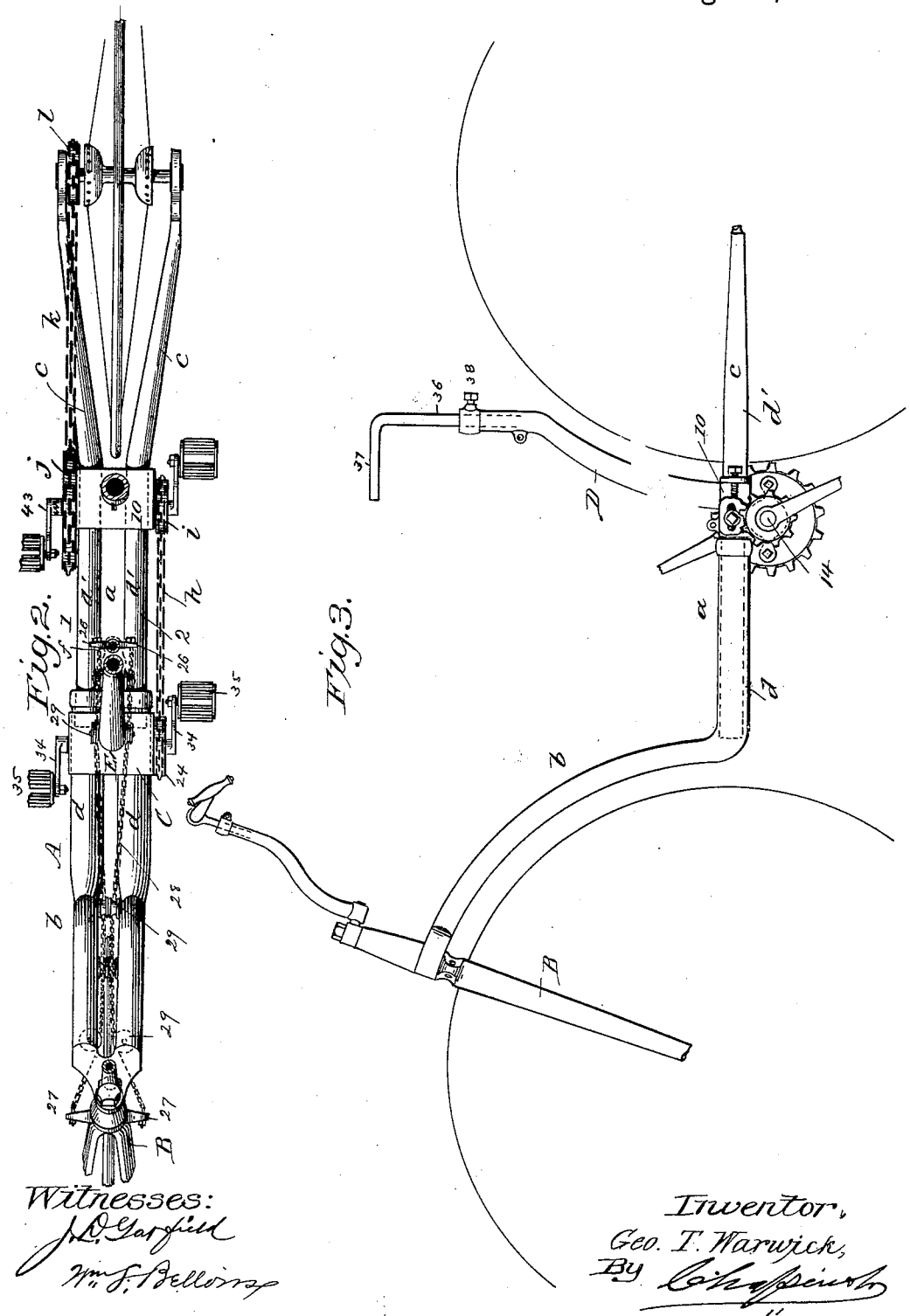
Witnesses:
J. O. Garfield
Wm. S. Bellows
Inventor,
Geo. T. Warwick,
By
Attorneys.

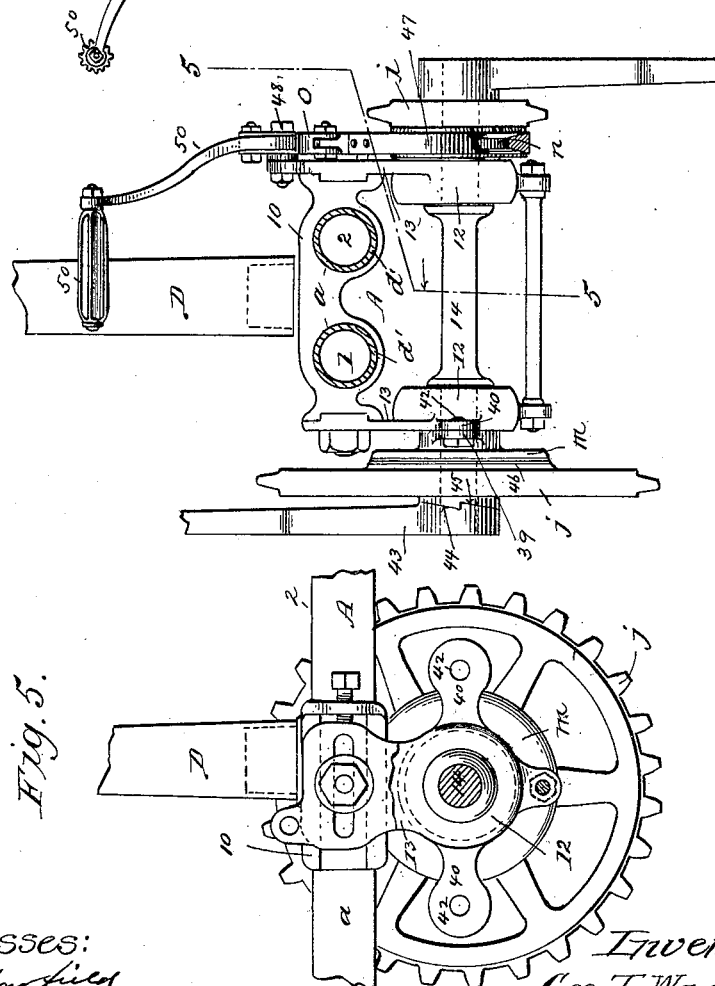

(No Model.)  5 Sheets—Sheet 4.
G. T. WARWICK.
VELOCIPEDE.
No. 434,615.  Patented Aug. 19, 1890.
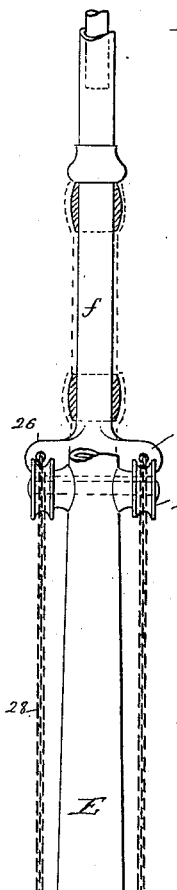
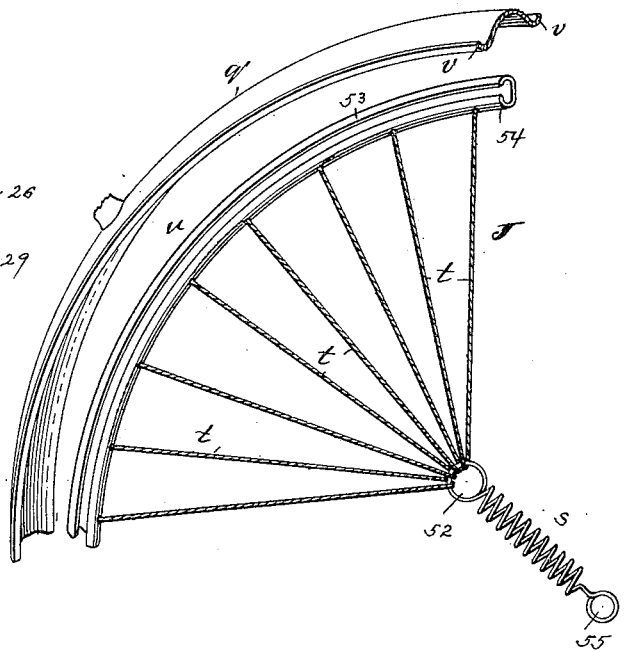
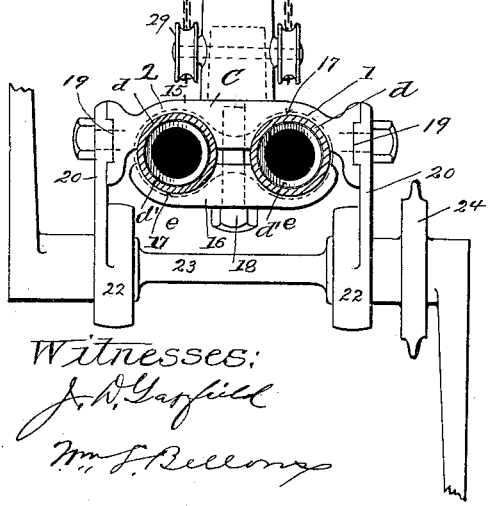
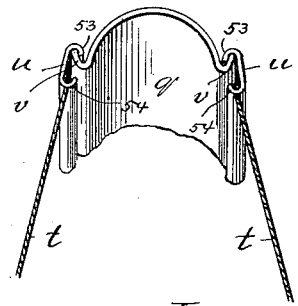
Witnesses:
J. W. Garfield
Wm. F. Bellows
Inventor:
Geo. T. Warwick,
By Chapin
Attorneys (No Model.)　　　　　　　　　　　　　　　　5 Sheets—Sheet 5.
G. T. WARWICK.
VELOCIPEDE.

No. 434,615.　　　　　　　　　　　Patented Aug. 19, 1890.

Witnesses:

Inventor
Geo. T. Warwick
By
Attorneys

UNITED STATES PATENT OFFICE.

GEORGE T. WARWICK, OF SPRINGFIELD, MASSACHUSETTS, ASSIGNOR TO THE WARWICK CYCLE MANUFACTURING COMPANY, OF SAME PLACE.

VELOCIPEDE.

SPECIFICATION forming part of Letters Patent No. 434,615, dated August 19, 1890.

Application filed April 22, 1889. Serial No. 308,067. (No model.)

*To all whom it may concern:*

Be it known that I, GEORGE T. WARWICK, a subject of the Queen of Great Britain, residing at Springfield, in the county of Hampden and State of Massachusetts, have invented new and useful Improvements in Velocipedes, of which the following is a specification.

The object of the present invention is to improve the construction of velocipedes, particularly of the class known as "Safety bicycles," and relates to instrumentalities and constructions whereby the said bicycle may be converted from a tandem or double-seated machine, also having double driving mechanism and steering-connections, to a single-seated machine, which will then have but one set of driving mechanism, and, vice versa, to means whereby the machine may be retarded in its running by either of two sets of brake mechanism, one of which is combined with the pedal-shaft and the other with one of the sprocket-wheels, by the use of which the rider may brake when his feet are on the pedal or when coasting with his legs over the handle-bars by reaching a more convenient part of the latter-named brake.

The invention further relates to other constructions; and it consists in the various combinations of parts and specific constructions, all substantially as will hereinafter more fully appear, and be set forth in the claims.

Figure 10:
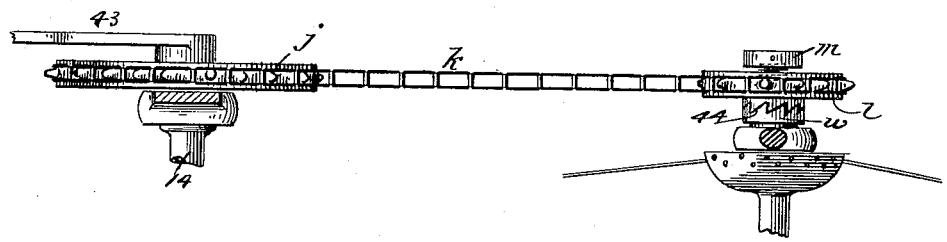
Figure 11:
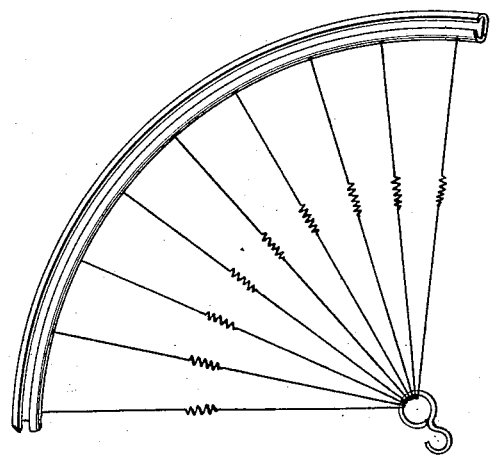
Figure 12:
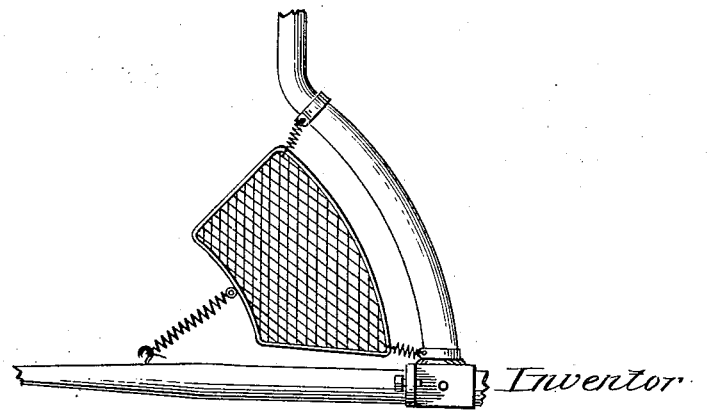

In the drawings forming part of this specification, Figure 1 is a side view of a Safety bicycle embracing in its construction the features of the present invention, or, in other words, having the removable appliances for constituting the machine a tandem applied thereon. Fig. 2 is a plan view of the parts of the frame of the machine as seen below the plane indicated by the line 2 2, Fig. 1. Fig. 3 is a side elevation of the frame of the machine, having the detachable parts for constituting the machine a tandem removed and showing one part of the frame as telescoped on the other, whereby the machine is best adapted for single riding. Fig. 4 is an enlarged vertical cross-sectional view of the machine on the line 4 4, Fig. 1. Fig. 5 is a sectional elevation of the parts seen in Fig. 4, but taken at right angles thereto, the plane of the section being indicated by the line 5 5 on said Fig. 4, there being omitted from said Fig. 5, however, a delineation of parts constituting a supplemental or coasting brake mechanism, seen in edge view in said Fig. 4; and Fig. 6 is a side elevation of said last-mentioned coasting-brake. Fig. 7 is a sectional elevation of the machine-frame to the rear of the line 7 7, Fig. 1, the upper parts of the saddle-post shown in said view being broken away, exposing to view a part of the steering-post carried at the rear thereof. Fig. 8 is a perspective view of a portion of the mud-guard and a dress-guard, to be hereinafter described; and Fig. 9 is an enlarged cross-sectional detail view of the mud-guard and part of the dress-guard engaged therewith. Figs. 10, 11, and 12 are views of modifications in construction, to be hereinafter referred to.

The frame A of the two-wheeled Safety bicycle as a whole consists of a horizontal intermediate portion $a$, a forward portion $b$, extended therefrom upwardly in a curve conforming to the circular contour of the front wheel and joined, by a suitable form of connection permitting a degree of rotation thereon, to the upper portion of the front-wheel fork B and rearward extensions $c$ of said intermediate portion, which are somewhat spread from each other and from the rear-wheel fork. The said frame A is preferably formed for its entire extent of two sets of metallic tubes 1 and 2, ranging in parallelism, each consisting of a forward and rearward member $d$ $d'$, the one adapted to telescope or slide on the other, whereby the distance between the front and rear-wheel forks B and $c$ may be greater or less, as desired, for double or single riding. The means whereby said telescoping action is effected, as particularly shown, is by forming the horizontal portion of each forward member $d$ of a size to receive within its bore the forward end portion of the horizontal part of each rear member $d'$, and set-screws $e$, or equivalent devices, are provided to screw through the end portion of the wall of each of said forward members against or into engagement with the portion of the other member inclosed therein.

The horizontal portion $b$ of the frame just in advance of the rear fork supports and is united by a yoke 10, on which a saddle-post D is sustained, and in which yoke longitudinal grooves are formed, in which are adjustably supported and guided the upper ends of the supporting-arms 13 for the boxes 12 for the sprocket-wheel shaft or axle 14, substantially as shown and described in an application for Letters Patent of the United States filed by me January 4, 1889, Serial No. 295,401, and in practice it is preferred to attach said yokes permanently on the stated portion of the frame in any approved manner.

C represents a yoke similar to the yoke 10, but adapted to be removably attached on the forward members $d$ $d$ of the sets of frame-tubes, and in Fig. 7 is shown as consisting of a pair of blocks 15 and 16, each having arc-shaped channels 17 therein corresponding to the circumference of the said tube members and adapted to be clamped thereon by one or more bolts 18. Said removable yoke, as the yoke 10, sustains a saddle-post E and is provided with longitudinal grooves 19, in which are adjustably supported and guided the upper ends of the supporting-arms 20 for the boxes 22, in which an axle 23 for the supplemental sprocket-wheel 24 bears. The said post E, supported on the removable yoke C and carrying a saddle F, also supports thereon a rotatable steering-spindle $f$, provided at its upper end with a transverse handle-bar 25 and at its lower end with laterally-extending arms 26 26. The front fork-head is also provided with laterally-extending arms 27 27, and between each side arm on said front fork-head and the steering-spindle $f$ flexible connections, as chains 28, are run, being guided by suitable sheaves 29, more or less in number, as desired, located on said forward tube members and on said supplemental saddle-post E, and the connections of said chains with said lateral arms are of a form readily detachable, such as by screw eye bolts, as shown, or otherwise.

When the machine is employed with the tandem appliances, the said handle-bar on the steering-spindle, supported on the saddle-post E, is within easy reach of the person riding on the rear saddle $g$.

The saddle-posts E and D are braced the one from the other by the rod 30, pivotally connected on the forward and adapted while in a horizontal position to be connected with the ear-piece 32 on the rear saddle-post, or while in an oblique position to be connected with the lower ear-piece 33 on said rear post, the latter disposition of said rod being preferable when a lady occupies the rear saddle.

A sprocket-chain $h$ passes around the sprocket-wheel 24, which is secured on the axle 23, carried by the removable yoke C and to and around a sprocket-wheel $i$, which is on the axle 14 for carrying the main and usual sprocket-wheel $j$, and from and around which main sprocket-wheel $j$ a sprocket-chain $k$ passes to and around the sprocket-wheel $l$ on the rear-wheel axle, and said sprocket-wheel axle 23, carried by the forward removable yoke C, is provided with cranks 34 and pedals 35.

When it is desired to convert the machine from a tandem to a single-riding Safety bicycle, the chain-connection 28 between the front fork and steering-spindle is removed, and the set-screws $e$ are unloosened, permitting a little further telescoping of the tubular frame members one on the other, when the sprocket-chain $h$ becomes slack and may be removed. The tubular members are then slid off and separated the one from the other, when on loosening the clamping-bolts 18 confining the parts of the yoke C together and permitting said parts to separate from each other, they may be slid off from the members $d$ of the frame, and of course carried with said part 15 of the yoke are the saddle-post E, saddle F, steering-spindle $f$ and handle-bars thereon, bearings 22, and the axle 23, carrying the pedal-cranks 34 and sprocket-wheel 24. The rear members $d'$ of the frame are then telescoped into the forward members $d$ to a considerable extent, as indicated in Fig. 3, whereby the distance between the front and rear axles is shortened and made the same as usual or desirable in ordinary single-riding machines, when the members are rigidly secured the one to the other by setting up the screws $e$ or whatever equivalent devices are employed therefor.

In Fig. 1 the saddle-post D is shown as provided with a spindle 36, rotatable therein and adapted to be firmly held by a set-screw 38, and on an angular arm 37 of which spindle the rear saddle is directly supported, and said spindle is shown as turned to present its angular arm rearwardly, so that the saddle may be, at the time of the tandem equipment of the machine, supported at a suitable distance from and behind the forward saddle; but when the machine-frame is shortened up, the removable equipments being detached therefrom, it is preferred to swing said spindle so as to bring its angular saddle-carrying arm to the front, as shown in Fig. 3, and then the saddle will be supported a little forward of the said position shown in Fig. 1.

One of the boxes 12, supported by the yoke 10, and in which the axle 14, having the sprocket $j$ fixed thereon, bears for free rotation, has affixed thereto a disk $m$, located between the outer side of said box 12 and the inner end of the hub of said sprocket-wheel $j$, and in the hub of which disk said axle 14 also freely rotates. The connection between the box 12 and the hub of said disk $m$ is by the lugs 39 40 on said parts confined by the bolts 42. The one of the cranks 43 which is fixed on the axle 14 adjacent to and outside of the said sprocket-wheel $j$ has the inner surface of its hub toward said sprocket-wheel provided with a series of ratchet inclined faces, as seen at 44 in Fig. 4, the adjacent surface of the sprocket-hub being also provided with corresponding and interlocking inclined faces 45, the inclines and shoulders of which adjacent ratcheted parts are so disposed that when the rider is pedaling forward the ratchet-shoulders will abut or interlock, and the sprocket will be thereby driven the same as if it were keyed on the axle; but on desiring to retard the speed of the bicycle when running by "back pedaling," or forcing against the pedal by the foot in a direction opposite to that of its regular forward revolution, the inclines of its ratchet-faces 43 will force the sprocket-hub inward and by its inner slightly axially-extended face 46 against the face of the disk $m$, that is held immovable on and from the bearing-box 12, there being permitted a slight play of said sprocket-wheel on the axle 14.

The improvement in velocipede-brakes, of which an approved form and arrangement has been described as above, (and which improvement consists, broadly, in the combination, with the running-axle, of a velocipede having thereon a flange or enlargement provided with ratchet or cam faces, and also a friction-disk of a wheel or roller, an example of which is comprised in the sprocket-wheel $j$, mounted and adapted to have a longitudinal movement on said axle, having ratchet or cam faces adapted to interlock with those of said axle enlargement, and thereby to have its rotation in one direction prevented, and on a reversed rotation of said wheel relatively to said axle to insure a movement of the wheel against the friction-disk,) is susceptible of various modifications, and in Fig. 10 a modification is shown in which the friction-disk $m$, in lieu of being carried on the frame of the machine, is formed on the axle of the rear wheel of the bicycle, the inclined faces corresponding to those shown on the hub of the pedal-crank in Fig. 4 being formed on a flange or enlargement $w$ of the rear-wheel axle, and the rear sprocket-wheel has a ratcheted hub and axially movable between the said disk and ratcheted enlargement and is adapted to act as the brake-shoe, and in this form and arrangement the chain from the sprocket-wheel on the axle, also passing around and engaging the rear bicycle-wheel sprocket, is the medium for controlling the action of the brake mechanism, said chain being, however, primarily controlled by the pedal-cranks, for in riding with the feet on the pedal, on forcing backwardly on the pedal, retarding the movement of the chain the same in turn retards the movement of said rear sprocket-wheel with relation to the running of the rear bicycle-wheel axle under its momentum, and is in effect the same as a reversal of its rotation on said axle, for it insures a moving of said cam-faces, the one upon the other, to secure the forcing and contact of the sprocket-wheel against the disk. A friction-disk is fixed on the other end of said axle 14 from that carrying said sprocket $j$ and just inside of the sprocket $i$, about the periphery of which disk is placed a brake-band 47, which by its ends is connected to the ends of a lever $o$, intermediately carried on a rocker shaft or arbor 48, having a bearing in an extension 49 from said yoke 10, and on the said rocker-arbor is fixed a lever-arm $p$, projected upwardly and forwardly and having on its end a treadle-bar 50.

At the time of "coasting" or riding the machine down steep grades with the feet over the handle-bar, on desiring to retard the speed more quickly than could be done by groping, as it were, with the feet for the pedals to "back-pedal," as before explained, one foot may be readily moved to reach the end of said lever-arm, when downward pressure thereon will swing the ends of said lever and draw the brake-band to a peripheral bind upon the friction-disk $n$.

It will be apparent that a brake mechanism operated through the pedal, and also another brake mechanism more readily operated when the feet are not on the pedals, comprised in a single machine render such machine of greater efficiency and safety, and are most desirable provisions.

In Figs. 1, 8, 9, 11, and 12 is shown an improved dress-guard supported on or from the frame of the machine, consisting of a suitable open-work structure comprising operatively therein one or more springs, whereby in the running of the machine with this kind of guard thereon the constant vibration, drumming, and rattling, which have heretofore been a disagreeable feature of light dress-guards, will be avoided, and, furthermore, the improved dress-guard is constructed whereby it is capable of ready attachment to and removal from the machine.

As shown in Figs. 1, 8, and 9, said dress-guard J consists in the arc-shaped holder $u$, adapted to conform to the curve of the mud-guard $q$ and to be interlocked therewith, the spring $s$, adapted to be attached to the bearing for the rear wheel and having a suitable eye 52, and the stays $t$, formed by a cord passed by portions of its length from said spring-eye to suitable points in the length of said arc-shaped holder. As shown, the mud-guard has at its edge an angular lip $v$, and the said holder $u$ is of C shape in cross-section, forming opposing lips 53 and 54, with an opening between, one lip 53 of said holder engaging the mud-guard lip $v$, while in the other lip 54 suitable holes are made, through which said cord is laced. The spring $s$, by its end opposite to that receiving the connection of said stays, is adapted by an eye formation, as at 55, to engage with a suitable stud on the bearing $r$. In Fig. 11 in lieu of the spring being located at and attached to one terminal portion of the open-work structure formed by the series of stays $t$, the stays comprise springs in themselves, formed in intermediate portions of their lengths, and in Fig. 12 a still further modification of form is illustrated, in which the dress-guard consists in a frame-bounded open-work structure, said dress-guard frame having all its connections with the bicycle-frame constituted by springs;

but from the foregoing recital of the essential features in the dress-guard and the several illustrations thereof given it will be apparent that innumerable modifications in form and detail may be carried out without departing from the gist of the invention.

What I claim as my invention is—

1. In a bicycle, a frame formed in forward and rear sections and adapted to slide longitudinally the one upon the other, a seat permanently supported on said frame, and a permanent driving mechanism, and a seat adapted to be removably attached to said frame, and a supplemental driving mechanism adapted to be removably affixed on the machine, substantially as described.

2. In a bicycle having on one wheel thereof a sprocket, a frame formed in forward and rear telescoping sections, a yoke permanently supported on said frame carrying an axle provided with two sprocket-wheels, a yoke removably attached to said frame supporting a seat, and an axle having thereon pedal-cranks and a sprocket-wheel, a chain around and connecting said latter sprocket-wheel and one sprocket-wheel carried on said yoke, and a chain around and connecting the other yoke, yoke-sprocket, and the said bicycle-wheel sprocket, substantially as described.

3. In a Safety bicycle, a frame comprising a horizontal intermediate portion, a forward portion upwardly curved, and the rear-wheel fork carried on and at the rear of said intermediate portion, and said frame consisting of two side sets of tubes ranging in parallelism at the intermediate and forward curved portion and inwardly diverging to form said rear fork, and each side set consisting of the forward and rear members $d\ d^2$, adapted the one to telescope on the other longitudinally, substantially as described.

4. In a Safety bicycle, a frame comprising a horizontal intermediate portion, a forward portion upwardly curved, and the rear-wheel fork carried on and at the rear of said intermediate portion, and said frame consisting of two side sets of tubes ranging in parallelism at the intermediate and forward curved portion and inwardly diverging to form said rear fork, and each side set consisting of the forward and rear members $d\ d^2$, adapted the one to telescope on the other longitudinally, combined with the removable yoke C, consisting of the separable blocks 15 and 16, having the grooves 17 to fit said tubular members, and means for clamping said blocks together, substantially as described.

5. In a bicycle, the front fork provided with lateral arms 27 27, a frame formed in forward and rear telescoping sections and provided with a permanent saddle-post and a removable saddle-post having thereon a steering-spindle provided with lateral arms 26 26, and connections between the pairs of arms 26 and 27, substantially as and for the purpose described.

6. The combination, with a friction-disk suitably supported and fixed on the frame, of an axle also having suitable bearings for rotation on said frame and through said disk, and having a pedal-crank fixed on its end, the hub of which is provided with ratchet or cam inclined faces, and the sprocket-wheel longitudinally movable on said axle and having its hub provided with inclined faces corresponding with those of said crank-hub, substantially as described, for the purpose specified.

7. In a velocipede, the combination, with one of the boxes for the sprocket-wheel axle having the ear-pieces 40 and the friction-disk $n$, having ear-pieces 39 bolted thereto, of the axle 14, having a pedal-crank fixed on its end, the hub of which is provided with ratchet or cam-inclined faces, and the sprocket-wheel longitudinally movable on said axle and having its hub provided with inclined faces corresponding with those of said crank-hub, substantially as described.

8. A dress-guard for velocipedes, consisting of a suitable frame or structure adapted by different sides thereof to be attached to the velocipede-frame and provided with one or more springs by means of which said guard in its connection with the velocipede-frame will be held in tension.

9. An attachable and detachable dress-guard for velocipedes, consisting of an arc-shaped holder adapted to interlock with the mud-guard, a spiral spring provided with an eye and a series of stays or cords attached to said spring and extended therefrom and secured to said holder, and having a disposition and arrangement between said spring and mud-guard to form a suitable open-work structure, substantially as described.

10. In a velocipede having a mud-guard, the combination, with said guard and the bearing for the corresponding wheel, of a spring attached to said bearing and a series of stays or cords attached to said spring and extended therefrom and secured to the mud-guard, and having a disposition and arrangement between said spring and mud-guard to form a lattice-work structure suitable for a dress-guard, substantially as described.

11. The combination of the bearing and mud-guard for a velocipede-wheel, the former having a lip $v$, a holder C, shaped in cross-section, whereby lips 53 and 54 are formed, the former adapted to engage the said mud-guard lip and the latter provided with a series of perforations, a spring adapted to be removably attached to said bearing and having an eye 52, and a cord passed by portions of its length between and connected with said spring and perforated holder-lip, substantially as described.

GEO. T. WARWICK.

Witnesses:
WM. S. BELLOWS,
J. D. GARFIELD.